April 12, 1960 O. JENSEN 2,932,781

SEMI-CONDUCTOR PROTECTIVE MEANS

Filed Feb. 28, 1958 2 Sheets-Sheet 1

INVENTOR.
OTTO JENSEN

BY Ostrolenk, Faber, Gerb & Soffen

ATTORNEYS

April 12, 1960 O. JENSEN 2,932,781

SEMI-CONDUCTOR PROTECTIVE MEANS

Filed Feb. 28, 1958 2 Sheets-Sheet 2

INVENTOR.
OTTO JENSEN

BY Ostrolenk, Faber,
Gerb & Soffen
ATTORNEYS 2,932,781

SEMI-CONDUCTOR PROTECTIVE MEANS

Otto Jensen, Malvern, Pa., assignor to I-T-E Circuit Breaker Company, Philadelphia, Pa., a corporation of Pennsylvania Application February 28, 1958, Serial No. 718,294

14 Claims. (Cl. 321—12)

My invention relates to a protective means for a series connected string of parallel connected semi-conductor or metallic diodes wherein each individual rectifier is provided with a respective series connected fuse means so that the complete string will not be opened responsive to the failure of any of the diodes.

Parallel connected groups of semi-conductor or metallic diodes are commonly connected in series when the inverse voltage of the system being rectified is higher than the rated inverse voltage of a single diode.

When a single diode fails, the current conditions of the string are substantially unaffected, since the forward current is determined only by load conditions while the inverse current is still maintained low by the remaining rectifiers. However, the parallel connected group containing the faulted diode is short circuited so that the inverse voltage is redistributed between the remaining series connected groups of diodes and is higher for each diode group. Because of this, the remaining groups of diodes will begin to fail in view of the increased inverse voltage applied to them. Thus, a second diode group will fail causing an even more severe redistribution of the inverse voltage across the remaining cells, and finally each of the diode groups of the series string will fail. At this time, an inverse current of substantial magnitude will flow through the faulted string of diodes so that a fault sensing means may be operated to disconnect the string from the line.

In U.S. patent application Serial No. 627,469 filed December 10, 1956, now Patent No. 2,895,099, in the name of I. K. Dortort and entitled "Voltage Balancing for Series Connected Rectifiers," and assigned to the assignee of the instant inventon a system for distributing inverse voltage between the series connected diodes of a chain is described.

In the above invention each diode of a series connected string is provided with an auxiliary voltage source, where the auxiliary voltage source applies across its respective diode precisely its share of inverse voltage. Thus, each diode will conduct whatever reverse current its characteristic calls for independently of the characteristic of the other series connected diodes, and the inverse voltage will be exactly distributed between the series connected rectifiers in a predetermined manner.

The essence of my invention is to provide a fuse means in series with each diode of the above noted type of unit where an auxiliary voltage source is utilized to impress a predetermined voltage across its respective group of parallel connected diodes. Each individual fuse is rated to be inoperative under the normal conditions of a forward current of load magnitude and a reverse current of negligible magnitude. When, however, the diode fails, it will carry both the normal forward current of the diode string, and because of the auxiliary voltage source for balancing the voltage between the parallel connected groups of diodes of a string, it will also conduct a high reverse current which is generated by the auxiliary voltage source. The conduction of reverse current, as well as forward current in the diode and its series connected fuse will be sufficient to cause operation of the fuse and an opening of the particular diode with respect to its remaining parallel connected elements whereby the remaining series connected groups of diodes are unaffected by the failure of the first mentioned diode. Hence all of the remaining diodes are protected and the unit remains on the line.

If desired, a further interconnection may be made from a circuit interrupting means associated with the complete rectifier unit and an over-current means associated with the auxiliary voltage sources whereby the sensing means will be energized responsive to conduction of reverse current to subsequently trip the circuit interrupting means and thus take the complete unit off the line so that the defective diode may be replaced. However, with proper precautions, the diode could be replaced under load conditions.

Accordingly, the primary object of my invention is to provide a novel protective system for a rectifier system comprising series connected parallel groups of diodes.

Another object of my invention is to provide a respective fuse for each of a plurality of parallel connected diodes whereby the fuse will be operated responsive to failure of its respective diode so that the complete string of series connected groups of diodes will be protected.

Another object of my invention is to provide a novel protective means for series connected diodes having auxiliary voltage sources associated therewith for distributing inverse voltage.

A further object of my invention is to provide a novel protective means for a string of series connected diodes wherein each diode is associated with a respective fuse, and each diode and the fuse associated therewith are associated with an auxiliary voltage source means for forcing substantial reverse current through the diode and its respective fuse in the event of failure of the diode.

These and other objects of my invention will become apparent from the following description when taken in connection with the drawings, in which:

Figure 1 is a circuit diagram of a single phase full-wave rectifier system which illustrates the principles of my novel invention.

Figure 1*a* shows the circuit of Figure 1 when using a string of three series connected rectifiers.

Figure 1:
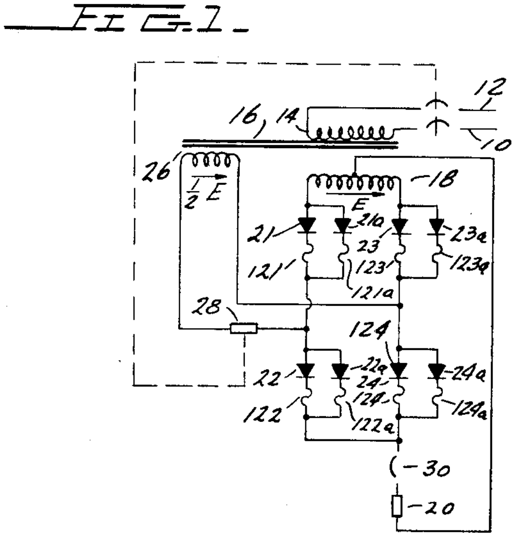

Referring now to Figure 1, a single phase A.-C. source comprising the lines 10 and 12 is connected to energize primary winding 14 of the main transformer 16. Secondary winding 18 is then connected to energize D.-C. load 20 through series connected groups of parallel connected diodes 21—21*a*, 22—22*a* and 23—23*a*, 24—24*a* respectively.

Each of series connected diode groups 21—21*a*, 22—22*a* and 23—23*a*, 24—24*a* are associated with fuses 121, 121*a*, 122, 122*a*, 123, 123*a*, 124 and 124*a* respectively in accordance with my novel invention.

In considering the operation of the right hand branch, it is first assumed that each of the diodes 23—23*a* and 24—24*a* will have an inverse voltage rating which is at least ½ of the peak inverse voltage which is to appear across their corresponding branch.

Figure 2:
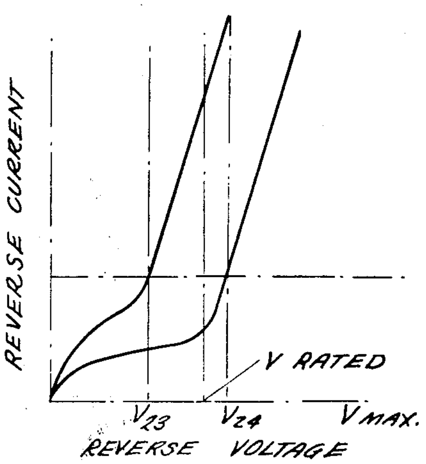
Figure 2 shows the inverse votage characteristics of the rectifier cells of Figure 1.

During reverse voltage conditions, the reverse current as a function of reverse voltage for each of diodes 23 and 24 is shown in Figure 2. For purposes of simplicity it will be assumed that the parallel connected groups of diodes have matched characteristics although this is not necessary. However, it simplifies the present description since only one diode of a parallel connected group need be discussed. Since the diodes 23 and 24 are connected in series, the same reverse current flows therethrough, indicated as current $i_R$ in Figure 2. If, however, the diodes are mismatched in their reverse characteristics, it is seen in Figure 2 that the reverse voltage $V_{24}$ appearing across diode 24 would be substantially larger than the reverse voltage $V_{23}$ which appears across diode 23. Hence, if each diode is rated at $V_{rated}$ which is one-half of the maximum inverse voltage $V_{max}$ which appears across their branch, it is seen that the voltage $V_{24}$ appearing across diode 24 exceeds its rated voltage $V_{rated}$ and a breakdown or damage of diode 24 will occur. It is for this reason that a substantial derating of series connected diodes has been necessary in the past, even though the voltage characteristics may be closely matched.

Furthermore, as time passes, the individual diodes age and their characteristics change so that while their characteristics may be substantially identical at first, after a period of operation, their characteristics may vary so with respect to one another that break-down of one of the diodes will occur due to the appearance of too large an inverse voltage thereacross.

In order to ensure equal voltage distribution between diodes 23 and 24, I provide an auxiliary winding 26, the impedance of which is substantially higher than that of load 20, which applies a voltage across diode 24 which is one-half of the voltage of secondary winding 18 and is in phase therewith. Accordingly, at any instant during the non-conducting period the voltage appearing across either of the diodes will assume the value of one-half E as the voltage induced in winding 18 is the voltage E regardless of the inverse voltage characteristic of either of the diodes.

This is true since the inverse current through each of rectifiers 23 and 24 no longer needs to be identical, as was true in the past, since the auxiliary voltage source 26 now allows the inverse current of diode 24 to flow independently of the inverse current of diode 23.

That is to say, the inverse current of rectifier 23 flows in the circuit including winding 18, winding 26 and rectifier 21, while the inverse current of the circuit including rectifier 24 flows in the circuit including winding 26, and rectifier 22, the magnitude of the inverse current being determined only by the particular inverse voltage characteristic of each of diodes 23 or 24 at the voltage value ½ E.

In the event of a failure of either of diodes 23 or 24, the parallel diodes associated therewith will be short circuited so that the remaining series connected group diode will have to assume the full inverse voltage of the system, thus leading to the failure of those diodes as well. In accordance with my novel invention, however, and assuming that diode 23 is the diode which fails, when inverse voltage is applied to the series combination of diode 23 and fuse 123 a substantial reverse current will flow through fuse 123. However, fuse 123 is so rated as to normally conduct only the forward current of diode 23 so that when forward current as well as reverse fault current is conducted by the fuse, it will operate to thereby disconnect diode 23 from the system, leaving diode 23a to operate normally, but at an increased load thus protecting the remaining diode 24 from excessive inverse voltage which would normally appear thereacross. Furthermore, the system remains on the line and the defective diode 23 can be replaced without abutting down the system.

In a similar manner, fuse 124 will operate responsive to failure of diode 24, fuse 122a will operate responsive to the failure of diode 22a and fuse 124a will operate responsive to the failure of diode 24a.

This sharp increase in current drawn from auxiliary voltage source 26 during fault conditions may be utilized further to energize a fault sensing device 28. Fault sensing device 28 may be of any desired type and could operate to initiate operation of the A.-C. breaker in lines 10 and 12, as indicated by the dotted lines, or could operate the D.-C. breaker 30, or both the A.-C. and D.-C. breaker, in order to remove all of the undamaged diodes from the line. Since no current limiting devices are necessary in the auxiliary circuits, it is to be noted that the power available for operating the fuse and the fault sensing equipment is considerable, so that it is possible to achieve high speed operation of the fuse as well as a rapid de-energization of the system responsive to the currents of a failure of any of the diodes of the system.

Figure 1A:
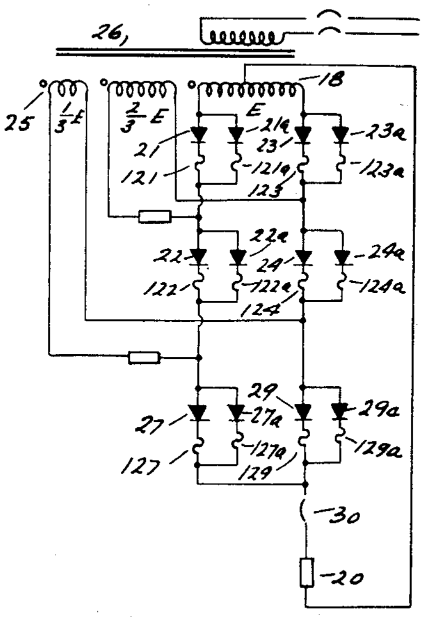

If, as shown in Figure 1*a*, instead of the two series connected rectifiers of Figure 1, it is necessary to use three series connected rectifiers, the circuit may be modified by adding a third parallel connected group of diodes 27—27a, and 29—29a and 23a and a corresponding auxiliary voltage source 25. In accordance with my novel invention, each of diodes 27—27a and 29—29a are associated with a series connected fuses 127—127a and 129—129a respectively.

Since three diodes 23, 24 and 29 are now used in and assuming that it is desired to have ⅓ the line voltage appear across each group associated with these diodes then the voltage of winding 25 will be ⅓ E.

Application of simple circuit analysis to Figure 1*a* shows that diode 23 is subjected to the voltage difference of windings 18 and 26, rectifier 24 is subjected to the voltage difference of windings 26 and 25, while rectifier 29 assumes the voltage of winding 25. Accordingly, each diode is subjected to ⅓ of the voltage of the main voltage source 18, the individual reverse currents being supplied from individual circuits.

Figures 3, 5:
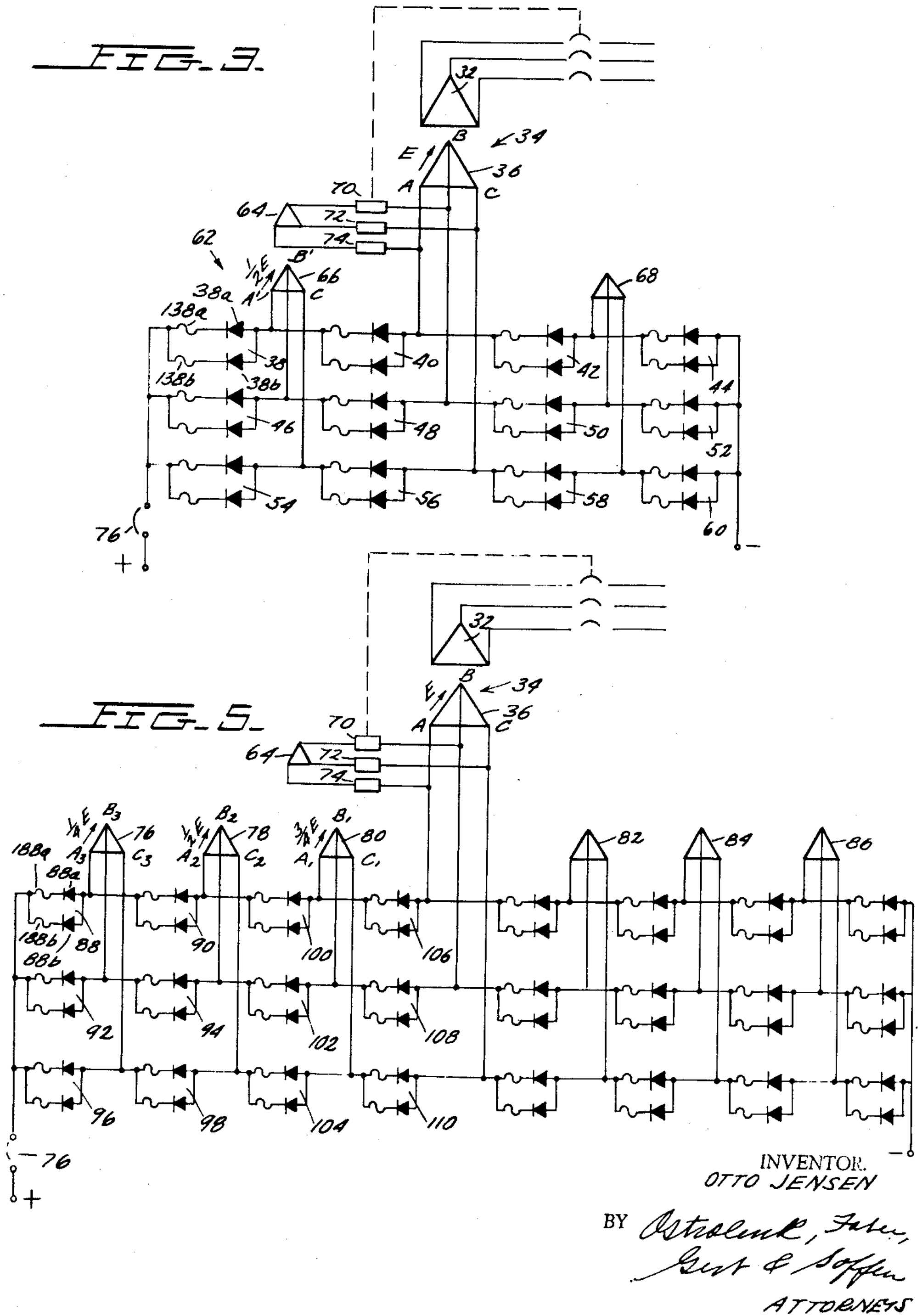
Figure 3 shows a circuit diagram of a three phase full-wave rectifier system which is adapted in accordance with my novel invention.
Figure 5 shows the rectifier of Figure 3 with four diodes connected in series in each phase.

The application of my novel invention to a three phase rectifier system is shown in Figure 3 wherein a three phase line is connected to energize the primary windings 32 of a multiphase transformer 34. The secondary windings 36 of transformer 34 are then connected for three phase full wave rectification by means of parallel connected diode groups 38, 40, 42, and 44, for phase A; 46, 48, 50 and 52 for phase B; and 54, 56, 58 and 60 for phase C. The operation of transformer 34 and its associated rectifier of phases A, B and C proceeds in the manner well known in the art.

In order to ensure an equal voltage distribution across diode groups 38—40, 42—44, 46—48, 50—52, 54—56, and 58—60, I provide an auxiliary transformer 62 comprising a primary winding 64 energized from secondary winding 36, the transformer 62 having two secondary windings 66 and 68. Each of the diodes of diode groups 38 through 60 are then associated with a respective series connected fuse in accordance with my novel invention. By way of example, the two diodes of group 38 are associated with fuses 138a and 138b respectively.

The two secondary windings 66 and 68 are auxiliary voltage means constructed to inject a voltage between the junctions of the above noted groups of series connected diodes so as to assure an equal voltage distribution therebetween. By way of example, point A′ of secondary winding 66 is connected to the junction between diode groups 38 and 40, point B′ is connected between the junction of diode groups 46 and 48, and point C′ is connected between the junction of diode groups 54 and 56.

In a similar manner, secondary winding 68 injects a voltage between diode groups 42—44, 50—52 and 58—60. The voltage appearing on secondary winding 66 as compared to the voltage of the main transformer winding 36 is shown in Figure 4 for conduction of diode groups 38 and 40, which shows the voltages $E_{AB}$, and $E_{CA}$, and $E_{BC}$ of secondary winding 36 as compared to the voltages $E_{A'B'}$, $E_{A'C'}$, and $E_{B'C'}$ of secondary winding 66.

Clearly, the same vector diagram would obtain when comparing the phase voltages of secondary winding 68 to secondary winding 36.

Figure 4:
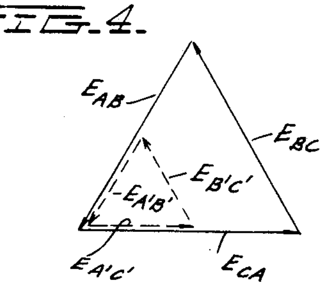
Figure 4 shows a vector diagram of voltage conditions within the circuit of Figure 3.

It is seen in Figure 4 that since equal voltage distribution is desired between the various diode groups, the magnitude of the voltages appearing across secondary winding 66 is ½ of the magnitude of the voltages of secondary winding 36.

This is true since the secondary windings 66 and 68 serve to isolate their respective series connected diode groups in so far as flow of inverse current is concerned and supply whatever inverse current is required for each individual diode for the predetermined inverse voltage appearing across that diode.

Clearly, in the event of the failure of any one of the diodes, there will be a rapid operation of its respective fuse which is rated only to carry the forward current of the diode. By way of example, fuse 138*a* associated with diode 38*a* is rated to carry only the forward current of the diode 38*a*, its reverse current being substantially negligible. When, however, diode 38*a* fails, a substantail reverse current will be conducted through this diode when inverse voltage is applied thereacross. That is, when diode group 46 conducts in its forward direction, the winding of secondary 66 associated with diode groups 38 and 46 will be connected directly in series with diode groups 46 and 38 to drive a substantial current in the reverse direction of diode 38*a* when it fails so as to initiate operation of fuse 138*a*.

Accordingly, the fuse 138*a* will disconnect diode 38*a* and the system will remain on the line.

In order to provide rapid disconnection or protection of the rectifying system responsive to the failure of any one of its component diodes, fault sensing devices of any well known type may be provided in series with the primary winding 64 and are indicated as the fault sensing devices 70, 72 and 74. Thus, in the event of a failure of any of the diodes of the circuit of Figure 3, either secondary winding 66 or secondary winding 68 will see an increased current flow. This increase will be reflected into the primary winding 64 and, therefore, one of the devices 70, 72 or 74 will be energized, even though only one element of a series chain has failed. However, the complete chain of diodes associated with the faulted diode will have been protected through the operation of its associated fuse until the circuit interrupting means can be energized to subsequently operate the A.-C. breakers, as indicated by the dotted line.

Thus, returning to the case where diode 38*a* has failed and fuse 138*a* has operated to protect diode group 40 connected in the same series chain, a short circuit current would appear in winding A'B' or A'C' and will cause an increase in current flow through fault sensing means 74 and 70, or 72, or all three. Fault sensing means 74 as well as fault sensing devices 72 and 70 in turn can be connected to cause operation of an A.-C. circuit breaker and of the D.-C. circuit breaker 76.

Figure 5 shows the manner in which my novel circuit may be extended to any number of series connected diodes, and an extension of Figure 3, wherein four diode groups per arm are used instead of two. Similar numerals in Figure 5 identify components similar to those of Figure 3. Here, however, instead of the two secondary windings 66 and 68 as used in the circuit of Figure 3, the auxiliary transformer 62 has six secondary windings 76, 78, 80, 82, 84 and 86. Secondary winding 76 injects a voltage between diode groups 88 and 90, 92 and 94, and 96 and 98. Secondary winding 78 injects a voltage between diode groups 90 and 100, 94 and 102, and 98 and 104. Secondary winding 80 injects a voltage between diode groups 100 and 106, 102 and 108, and 104 and 110. In a similar manner, secondary windings 82, 84 and 86 inject similar voltages between the series connected diode groups on the negative side of the rectifier system.

Clearly, each diode of diode groups 88 through 110 are associated with fuses or similar current interrupting means such as fuses 188*a* and 188*b* for diodes 88*a* and 88*b* of diode group 88 so that in the event that any of the diodes fail, their respective fuses will operate to protect the remaining diodes. Thus in the event of a failure of diode 88*a*, fuse 188*a* will operate to prevent short circuiting of diode 88*b* and subsequent failure of any of diode groups 90, 100 or 108.

Figure 6:
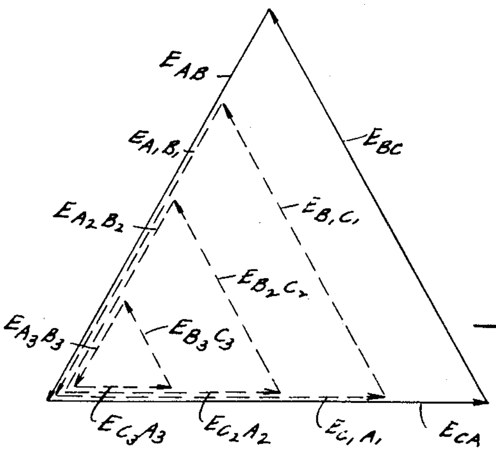
Figure 6 shows a vector diagram of the voltage conditions within the circuit of Figure 5.

The operation of this system which is substantially identical with that seen in Figure 4 may be understood with reference to the voltage vector diagram of Figure 6 which shows conditions during conduction of diode groups 88, 90, 100 and 106, wherein the voltages $E_{AB}$, $E_{BC}$ and $E_{CA}$ are the voltages of the main secondary winding 36, while voltages $E_{A_1B_1}$, $E_{B_1C_1}$ and $E_{C_1A_1}$ correspond to winding 80, voltages $E_{A_2B_2}$, $E_{B_2C_2}$ and $E_{C_2A_2}$ correspond to winding 78, and voltages $E_{A_3B_3}$, $E_{B_3C_3}$ and $E_{C_3A_3}$ correspond to winding 76. The voltage magnitude of winding 80 is ¾ of the voltage of winding 36, the voltage of winding 78 is ½ that of the winding 36, and the voltage of winding 76 is ¼ that of winding 36.

Accordingly, the voltage appearing on diode groups 106, 108 and 110 will be the main voltage less ¾ of its value or ¼ of the full voltage of transformer winding 36. The voltage on diode groups 100, 102 and 104 will be ¾ of the main voltage minus ½ of the main voltage or again ¼ of the main voltage and in a similar manner the voltage on diode groups 90, 94, 98, 88, 92 and 96 will be ¼ of the value of the main transformer winding.

Therefore, in each of the series connected arms of the rectifier system, the inverse voltage is equally distributed and the inverse current requirements of each of the individual diodes is supplied by its own individual voltage source.

Clearly, the same voltage conditions would obtain for the diode groups energized by the auxiliary voltage sources 82, 84 and 86.

In the event of a fault, the reversal of current through the faulted diode will cause a relatively large current drain on its associated secondary winding, this current increase being reflected in primary winding 64 to thereby subsequently operate one or more of fault sensing devices 70, 72 or 74, which in turn would cause operation of A.-C. circuit breakers such as breakers 101 or any other desired type of circuit protective equipment. There is a relatively large current drain through the auxiliary secondary windings, as stated above, so that the fuse associated with the faulted diode will conduct a substantial reverse current in addition to the normally rated forward current which will cause rapid fuse operation at a time prior to the disconnection of the rectifier unit from the system. Thus, the remaining diodes of the chain containing the faulted diode are protected until the rectifier is removed from the line.

Although I have described preferred embodiments of my novel invention, many variations and modifications will now be obvious to those skilled in the art, and I prefer, therefore, to be limited not by the specific disclosure herein but only by the appending claims.

I claim:

1. An electrical circuit for allowing predetermined distribution of inverse voltage between a first and second series connected diode; said first and second series connected diodes being connected in series with a first A.-C. source; each of said first and second series connected diodes being directly connected in series with a respective current interrupting means; said current interrupting means being constructed to prevent current flow therethrough responsive to the conduction of a fault current beyond a predetermined magnitude in their respective diodes; said electrical circuit comprising an auxiliary voltage source connected across said second diode and its said current interrupting means to pass inverse current through said second diode.

2. An electrical circuit for allowing predetermined distribution of inverse voltage between a first and second series connected diode; said first and second series connected diodes being connected in series with a first A.-C. source; each of said first and second series connected diodes being directly connected in series with a respective current interrupting means; said current interrupting means being constructed to prevent current flow therethrough responsive to the conduction of a fault current beyond a predetermined magnitude in their respective diodes; said electrical circuit comprising an auxiliary voltage source connected across said second diode and its said current interrupting means to pass inverse current through said second diode; said current interrupting means being a fuse.

3. An electrical circuit for allowing predetermined distribution of inverse voltage between a first and second series connected group of parallel connected diodes; said first and second series connected diode groups being connected in series with a first A.-C. source; said electrical circuit comprising an auxiliary voltage source connected across said second diode group to pass inverse current through said second diode group; said auxiliary voltage source being connected to impress a voltage across said second diode group having a magnitude equal to the voltage of said first A.-C. source minus the voltage desired to appear across said second diode group; the voltage impressed across said first diode group being one-half the value of the voltage of said first voltage source; each diode of said first and second diode groups having a respective fuse connected in series therewith; each of said fuses being constructed to operate responsive to the failure of their respective diode.

4. An electrical circuit for allowing predetermined distribution of inverse voltage between a first and second series connected group of parallel connected diodes; said first and second series connected diode groups being connected in series with a first A.-C. source; said electrical circuit comprising an auxiliary voltage source connected across said second diode group to pass inverse current through said second diode group; the magnitude of said auxiliary voltage source being the difference between the voltage of said first A.-C. source and the voltage to appear across said second diode group; a fault sensing means connected in said electrical circuit; said fault sensing means being operated responsive to an increase in current through said electrical circuit due to failure of one of said diode groups; said fault sensing means operating protective equipment responsive to operation thereof; each diode of said first and second diode groups having a respective fuse connected in series therewith; each of said fuses being constructed to operate responsive to the failure of their respective diode.

5. An electrical circuit for allowing predetermined distribution of inverse voltage between a plurality of series connected groups of parallel connected diodes; said electrical circuit comprising a plurality of voltage sources, one terminal of each of said voltage sources being connected to a respective junction between adjacently connected diode groups of said plurality of diode groups, the other terminal of said plurality of voltage sources being connected to allow passage of inverse current through each of said diode groups by their said respective voltage sources, the voltages of said plurality of voltage sources differing from one another by predetermined amounts, the voltage difference between the voltages impressed on the two junctions of any of said diode groups determining the inverse voltage appearing thereacross; each diode of said diode groups having a respective fuse connected in series therewith; each of said fuses being operable responsive to the failure of their said respective diode.

6. An electrical circuit for allowing predetermined distribution of inverse voltage between a plurality of series connected diodes regardless of their relative inverse voltage characteristics; said circuit comprising a plurality of voltage sources each being connected to pass inverse current through a respective diode of said plurality of diodes; at least one of said plurality of voltage sources being connected to complete a path through at least two adjacent diodes of said plurality of diodes; the voltages of said plurality of voltage sources connected across adjacent diodes being in phase with one another, the magnitude of voltage of said voltage sources differing from one another by the voltage which is to appear on their common diode; each of said diodes having a respective fuse connected in series therewith; each of said respective fuses being operable responsive to the failure of their said respective diode.

7. An electrical circuit for allowing predetermined distribution of inverse voltage between a plurality of series connected diodes regardless of their relative inverse voltage characteristics; said circuit comprising a plurality of voltage source; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; a fault sensing means connected in said electrical circuit; said fault sensing means being energized by failure of one of said diodes, said fault sensing means being constructed to operate protective equipment responsive to energization thereof; each of said diodes having a respective fuse connected in series therewith; each of said respective fuses being operable responsive to the failure of their said respective diode.

8. In a rectifier system comprising a plurality of series connected diodes for energizing a D.-C. load from an A.-C. source, electrical circuitry for maintaining a predetermined inverse voltage distribution between each of said diodes of said plurality of diodes; said electrical circuitry comprising a plurality of voltage sources for respectively impressing a predetermined voltage across a respective diode of said plurality of diodes; at least one of said plurality of voltage sources being connected to complete a current path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; each of said diodes having a respective fuse connected in series therewith; each of said respective fuses being operable responsive to the failure of their said respective diode.

9. In a rectifier system comprising a plurality of series connected diodes for energizing a D.-C. load from an A.-C. source; electrical circuitry for maintaining a predetermined inverse voltage distribution between each of said rectifiers of said plurality of diodes; said electrical circuitry comprising a plurality of voltage sources, one terminal of each of said voltage sources being connected to a respective junction between adjacently connected diodes of said plurality of diodes, the other terminal of said plurality of voltage sources being connected to complete a path for inverse current for each respective diode; the voltage difference between the voltages impressed on the two junctions of any of said diodes determining the inverse voltage appearing thereacross; each of said diodes having a respective fuse connected in series therewith; each of said respective fuses being operable responsive to the failure of their said respective diode.

10. In a multiphase rectifier system comprising a plurality of series connected diodes in each phase; electrical circuitry for each phase for maintaining a predetermined inverse voltage distribution between each of said series connected diodes of each respective phase; said electrical circuitry for each phase comprising a plurality of voltage sources, and the main voltage source of said rectifier system, one terminal of each of said voltage sources being connected to a respective junction between adjacently connected diodes, the other terminal of said plurality of voltage sources being connected to complete a path for inverse current for each respective diode; the voltage difference between the voltages impressed on the two junctions of any of said diodes determining the inverse voltage appearing thereacross; each of said diodes having a respective fuse connected in series therewith; each of said respective fuses being operable responsive to the failure of their said respective diode.

11. In a multiphase rectifier system comprising a plurality of series connected diodes in each phase; electrical circuitry for each phase for maintaining a predetermined inverse voltage distribution between each of said series connected diodes of each respective phase; said electrical circuitry for each phase comprising a plurality of voltage sources, and the main voltage source of said rectifier system, one terminal of each of said voltage sources being connected to a respective junction between adjacently connected diodes, the other terminal of said plurality of voltage sources being connected to complete a path for inverse current flow for each respective diode; the voltage difference between the voltages impressed on the two junctions of any of said diodes determining the inverse voltage appearing thereacross; a fault sensing means connected in said electrical circuit; said fault sensing means being energized by failure of one of said diodes, said fault sensing means being constructed to operate protective equipment responsive to energization thereof; each of said diodes having a respective fuse connected in series therewith; each of said respective fuses being operable responsive to the failure of their said respective diode; the operation of any of said fuses protecting each of said series connected diodes until said protecting equipment is operated.

12. In a multiphase rectifier system comprising a plurality of series connected diodes in each phase, electrical circuitry for each phase for maintaining a predetermined inverse voltage distribution between each of said series connected diodes of each respective phase; said electrical circuitry for each phase comprising a plurality of voltage sources; at least one of said plurality of voltage sources being connected to complete a path through at least two adjacent diodes of said plurality of diodes; the voltages of said plurality of voltage sources connected across adjacent rectifiers being in phase with one another; the magnitude of voltage of said voltage sources differing from one another by the voltage which is to appear on their common diode; each of said diodes having a respective fuse connected in series therewith; each of said respective fuses being operable responsive to the failure of their said respective diode; the operation of any of said fuses protecting each of said series connected diodes until said protecting equipment is operated.

13. An electrical circuit for allowing predetermined distribution of inverse voltage between a plurality of series connected diodes regardless of their relative inverse voltage characteristics; said circuit comprising a plurality of voltage sources; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; a fault sensing means connected in said electrical circuit; said fault sensing means being energized by an increase in inverse current beyond a predetermined value of one of said diodes, said fault sensing means being constructed to indicate the presence of said diode carrying said increased inverse current; each of said diodes having a respective fuse connected in series therewith; each of said respective fuses being operable responsive to the failure of their said respective diode; the operation of any of said fuses protecting each of said series connected diodes until said protecting equipment is operated.

14. An electrical circuit for allowing predetermined distribution of inverse voltage between a plurality of series connected diodes regardless of their relative inverse voltage characteristics; said circuit comprising a plurality of voltage sources; at least one of said plurality of voltage sources being connected to complete a path through at least two adjacent diodes of said plurality of diodes; the voltages of said plurality of voltage sources connected across adjacent diodes being in phase with one another; the magnitude of voltage of said voltage sources differing from one another by the voltage which is to appear on their common diode; a fault sensing means connected in said electrical circuit; said fault sensing means being energized by failure of one of said diodes, said fault sensing means being constructed to operate protective equipment responsive to energization thereof; the voltage across said series connected diodes being substantially equally redistributed after said failure of said last mentioned diode; each of said diodes having a respective fuse connected in series therewith; each of said respective fuses being operable responsive to the failure of their said respective diode.

No references cited.